(12) United States Patent
Kim

(10) Patent No.: US 7,904,733 B2
(45) Date of Patent: Mar. 8, 2011

(54) COMPUTER SYSTEM AND CONTROL METHOD THEREOF, AND REMOTE CONTROL SYSTEM

(75) Inventor: Chan-woo Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 800 days.

(21) Appl. No.: 11/758,988

(22) Filed: Jun. 6, 2007

(65) Prior Publication Data

US 2008/0104388 A1 May 1, 2008

(30) Foreign Application Priority Data

Oct. 26, 2006 (KR) .................. 10-2006-0104668

(51) Int. Cl.
*G06F 1/26* (2006.01)
(52) U.S. Cl. .................. 713/300; 713/1; 713/2
(58) Field of Classification Search .................. 713/300, 713/320, 323, 324, 340, 1, 2, 100; 726/34, 726/36
See application file for complete search history.

(56) References Cited

U.S. PATENT DOCUMENTS

| | | | | |
|---|---|---|---|---|
| 5,925,128 A | * | 7/1999 | Harmon | 726/36 |
| 6,158,020 A | * | 12/2000 | Locker et al. | 714/13 |
| 6,334,150 B1 | * | 12/2001 | Cromer et al. | 709/223 |
| 6,820,119 B1 | * | 11/2004 | Omizo | 709/223 |
| 2003/0204792 A1 | * | 10/2003 | Cahill et al. | 714/55 |
| 2005/0132180 A1 | * | 6/2005 | Parker | 713/1 |
| 2005/0221800 A1 | * | 10/2005 | Jackson et al. | 455/411 |

FOREIGN PATENT DOCUMENTS

| | | |
|---|---|---|
| CN | 1766836 | 5/2006 |
| JP | 2003-330726 | 11/2003 |
| KR | 98-4770 | 3/1998 |
| KR | 2000-60253 | 10/2000 |
| KR | 2002-5118 | 1/2002 |
| KR | 2003-9928 | 2/2003 |

OTHER PUBLICATIONS

Office Action issued by State Intellectual Property Office of China in Chinese Patent Application No. 2007101523497 on Jun. 26, 2009.

* cited by examiner

*Primary Examiner* — Mark Connolly
*Assistant Examiner* — Paul B Yanchus, III
(74) *Attorney, Agent, or Firm* — Jefferson IP Law, LLP

(57) ABSTRACT

A computer system including a system unit that performs a predetermined operation; a remote control signal receiving unit that receives a user setting from a remote controller, the user setting including at least one of a lock setting and a unlock setting of the system unit for security; and a controller that controls the system unit to perform a locking function of the system unit according to the user setting that is received by the remote control signal receiving unit.

28 Claims, 4 Drawing Sheets

US 7,904,733 B2

COMPUTER SYSTEM AND CONTROL METHOD THEREOF, AND REMOTE CONTROL SYSTEM

CROSS-REFERENCE TO RELATED APPLICATIONS

This application claims the benefit of Korean Patent Application No. 2006-104668, filed in the Korean Intellectual Property Office on Oct. 26, 2006, the disclosure of which is incorporated herein by reference.

BACKGROUND OF THE INVENTION

1. Field of the Invention

Aspects of the present invention relate to a computer system, a control method thereof, and a remote control system, and more particularly, to a computer system having a system locking function for system security, a control method thereof, and a remote control system.

2. Description of the Related Art

Since computer systems often manage and process important data, system security is a critical factor in designing computer systems. Typically, a computer system having a security function pre-stores information that can confirm permissions for users (hereinafter 'permission information'), such as a password, and allows the users to access the computer system only if input permission information matches the pre-stored permission when the system is turned on. The security function of the computer system that confirms the permissions to permit the use of the system is referred to as a "locking function."

However, a conventional computer system having such a locking function gives a user an inconvenience in that the user has to input permission information in detail after the computer system is turned on by means of a power switch disposed in a main body of the computer system. To overcome this problem, Korean Patent First Publication No. 2000-0060253 discloses a technique using a remote controller to generate a remote control signal including an identification number and a command code so as to remotely control a computer system.

However, this disclosed technique also has an inconvenience of setting a password using a basic input/output system (BIOS) setup menu or the like after the computer system is turned on in order to set a system locking function and performing various processes such as activating the system locking function. Particularly, the system locking function cannot be set while the computer system is turned off. Further, there is a desire to improve user's convenience for release of the system locking function as well as for the setting of the system locking function.

SUMMARY OF THE INVENTION

Accordingly, aspects of the present invention provide a computer system that is capable of setting and releasing a system locking function without difficulty and a control method thereof.

Other aspects of the present invention provide a computer system that is capable of setting and releasing a system locking function even when the system is turned off and a control method thereof.

Additional aspects of the present invention will be set forth in part in the description which follows and, in part, will be obvious from the description, or may be learned by practice of the present invention.

According to an aspect of the present invention a computer system is provided comprising a system unit to perform a predetermined operation; a remote control signal receiving unit to receive a user setting from a remote controller, the user setting including at least one of a lock setting and a unlock setting of the system unit; and a controller to control the system unit to perform a locking function according to the user setting that is received by the remote control signal receiving unit while the system unit is turned off.

According to another aspect of the present invention, the computer system further comprises an information storage unit, wherein the controller stores the received user setting in the information storage unit or changes the user setting stored in the information storage unit.

According to another aspect of the present invention, the controller stores or changes the user setting while the system unit is turned off.

According to another aspect of the present invention, the computer system further comprises a power supply unit to supply power to the system unit, wherein the system unit comprises a central processing unit (CPU) that receives power from the power supply unit to perform the operation, and wherein the controller comprises a microcomputer that stores or changes the user setting while supply of the power to the CPU is stopped.

According to another aspect of the present invention, when the system unit is turned on, if the CPU determines that the locking function is set based on the user setting stored in the information storage unit, the CPU stops booting the system unit until the locking function is released.

According to another aspect of the present invention, the computer system further comprises a display unit, wherein the CPU displays a message on the display unit while booting is stopped, indicating that the locking function is set.

According to another aspect of the present invention, the microcomputer controls the CPU to continue booting if the unlock setting of the locking function is received while booting is stopped.

According to the embodiment of the present invention, the microcomputer controls the power supply unit to stop the supply of power to the CPU if the unlock setting of the locking function is not received for a predetermined period of time after the system unit is turned on.

According to another aspect of the present invention, if the microcomputer determines that the locking function is set based on the user setting stored in the information storage unit when the system unit is turned on, the microcomputer controls the power supply unit to stop the supply of power to the CPU until the locking function is released, and the CPU continues the booting if the CPU receives power from the power supply unit.

According to another aspect of the present invention, the computer system further comprises a light emitting diode (LED) to indicate a setting state of the locking function, wherein the microcomputer turns on/off the LED if the locking function is set.

According to another aspect of the present invention, a remote control system is provided, comprising a remote controller; and a computer system comprising a system unit to perform a predetermined operation, a remote control signal receiving unit to receive a user setting from the remote controller, the user setting including at least one of a lock setting and a unlock setting of the system unit, and a controller to control the system unit to perform a locking function of the system unit according to the user setting that is received by the remote control signal receiving unit while the system unit is turned off.

According to another aspect of the present invention, a control method of a computer system is provided, the computer system comprising a system unit that performs a predetermined operation and the method comprising receiving a user setting from a remote controller, the user setting including at least one of a lock setting and a unlock setting of the system unit; and performing a locking function of the system unit according to the received user setting while the system unit is turned off.

According to another aspect of the present invention, the control method further comprises storing the received user setting or changing the stored user setting.

According to another aspect of the present invention, the storing or changing the user setting comprises storing or changing the user setting while the system unit is turned off.

According to another aspect of the present invention, the control method further comprises initiating a booting of the system unit when the system unit is turned on; and stopping the booting until the locking function is released according to the stored user setting.

According to another aspect of the present invention, the control method further comprises displaying a message while booting is stopped indicating that the locking function is set.

According to another aspect of the present invention, the control method further comprises continuing the booting if the unlock setting of the locking function is received while booting is stopped.

According to another aspect of the present invention, the control method further comprises turning off the system unit if the unlock setting of the locking function is not received after a predetermined period of time has elapsed since the system unit was turned on.

According to another aspect of the present invention, the control method further comprises, if it is determined that the locking function is set based on the stored user setting when the system unit is turned on, suspending the booting of the system unit until the locking function is released.

According to another aspect of the present invention, the control method further comprises informing a user that the system unit is in a locked state when the booting of the system is suspended.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects of the invention will become apparent and more readily appreciated from the following description of the embodiments, taken in conjunction with the accompanying drawings, in which.

DETAILED DESCRIPTION OF THE EMBODIMENTS

Figure 1:
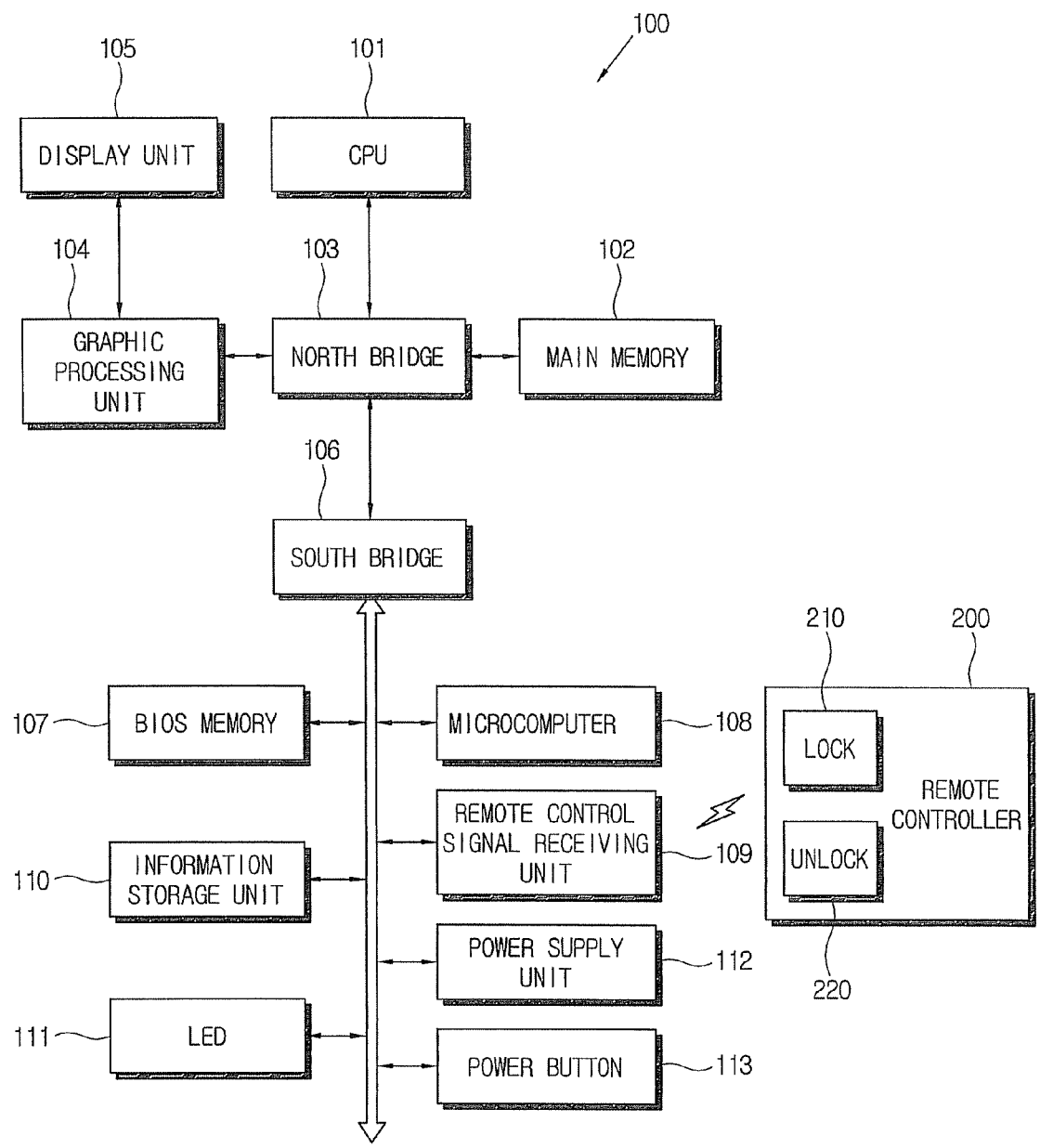
FIG. 1 is a block diagram showing a configuration of a computer system according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram showing a configuration of a computer system 100 according to an embodiment of the present invention. A computer system 100 comprises a central processing unit (CPU) 101, a main memory 102, a north bridge 103, a graphic processing unit 104, a display unit 105, a south bridge 106, and a BIOS memory 107. The CPU 101 executes a program stored in the main memory 102. The main memory 102 may be embodied by a random access memory (RAM) and stores the program to be executed by the CPU 101 and related data. A combination of the CPU 101, the main memory 102 and the program that is executed by the CPU 101 may be called a "system unit" according to aspects of the present invention. The program that is executed by the CPU 101 includes a basic input/output system (BIOS), an operating system, an application program, etc. The system unit performs a predetermined operation according to a related program. According to other aspects of the invention, the computer system 100 may comprise a different combination of components. The computer system 100 may be a desktop computer or a mobile device, such as a notebook computer, personal digital assistant, mobile phone, personal entertainment device, or the like.

The display unit 105 may be embodied by a monitor or the like. The graphic processing unit 104 performs a graphic process of an image displayed on the display unit 105 under control of the CPU 101. The north bridge 103, as a memory controller of the main memory 102, permits the CPU 101 and/or the graphic processing unit 104 to access the main memory 102. The BIOS memory 107 may be embodied by an electrically erasable and programmable read only memory (EEPROM) or the like and stores a BIOS code and system information. The computer system 100 may further comprise peripheral devices such as a hard disc drive (HDD, not shown), a keyboard (not shown), a mouse (not shown), a network card (not shown), a sound card (not shown), a universal serial bus (USB) controller (not shown) and so on. The south bridge 106 performs an interface between the peripheral devices and the CPU 101 by controlling input/output of the peripheral devices.

The computer system 100 may further comprise a power button 113 to turn the computer system 100 on and off. When the power button 113 is pushed (corresponding to turn-on of the system unit), the BIOS code stored in the BIOS memory 107 is loaded into the main memory 102 and the CPU 101 initiates booting by executing the BIOS code. The CPU 101 checks whether or not a locking function for security of the system is set. The computer system 100 may further comprise an information storage unit 110 in which information on setting the locking function (hereinafter also referred to as a "user setting") is stored. The information storage unit 110 may be embodied by an EEPROM. If the locking function is set (by referring to the user setting stored in the information storage unit 110,) the CPU 101 temporarily stops the booting until the locking function is released.

The computer system 100 further comprises a remote control signal receiving unit 109 to receive the user setting and a microcomputer 108 that sets or releases the locking function (hereinafter referred to as "locking setting," or "release setting") according to the user setting received by the remote control signal receiving unit 109. The remote control signal receiving unit 109 receives a remote control signal corresponding to the user setting from a remote controller 200. The remote controller 200 may have two buttons, a LOCK button 210 and a UNLOCK button 220 corresponding to the locking setting and the release (or unlocking) setting, respectively. The remote control signal comprises permission information such as a remote controller ID. According to other aspects of the present invention, the remote controller 200 may have additional buttons, and/or the functionality of the LOCK button 210 and UNLOCK button 220 may be combined into a single button.

If the user setting is inputted by the remote control signal receiving unit 109, then the microcomputer 108 stores the inputted user setting in the information storage unit 110 or changes a pre-stored user setting. The microcomputer 108 sets the locking function even if supply of electric power to the computer system 100 is stopped (the system unit is turned off). The computer system 100 further comprises a power supply unit 112 to supply electric power to the microcomputer 108 and the remote control signal receiving unit 109 even when the system unit is turned off. The microcomputer 108 is an example of a "controlling unit" of the present invention.

Figure 2:
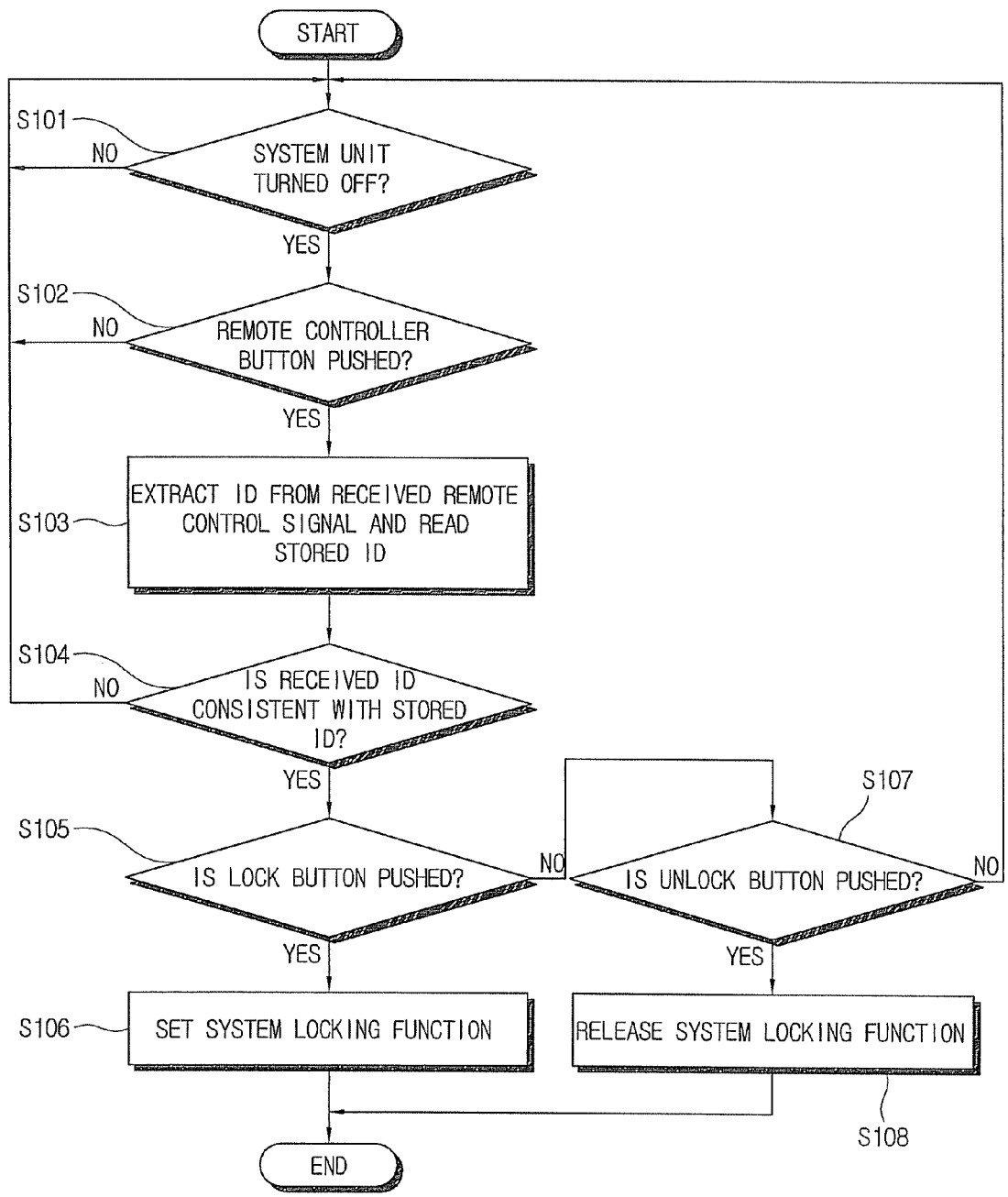
FIG. 2 is a flow chart illustrating a process of setting and releasing a system locking function according to an embodiment of the present invention.

FIG. 2 is a flow chart illustrating a process of setting and releasing the locking function according to an embodiment of the present invention. First, the microcomputer 108 determines whether or not the system unit is turned off at operation S101. If the system unit is turned off, then at operation S102 the microcomputer 108 determines whether one of the remote controller buttons is pushed on the basis of the remote control signal received in the remote control signal receiving unit 109 from the remote controller 200. As an alternative embodiment, the operations S101 and S102 may be reversed in order. As another alternative embodiment, the operation S101 may be omitted. In other words, the microcomputer 108 may perform the operation S102 even when the system unit is turned on.

If the remote control button is pushed at the remote controller 200, the microcomputer 108 extracts an identification (ID) of the remote controller 200 from the remote control signal received by the remote control signal receiving unit 109 at operation S103 and reads a remote controller ID pre-stored in the information storage unit 110. Next, the microcomputer 108 confirms permission by comparing the received remote controller ID with the pre-stored remote controller ID at operation S104. If the remote controller ID is not consistent with the stored remote controller ID, the process returns to the operation S101. If the received remote controller ID is consistent with the stored remote controller ID, the microcomputer 108 determines, at operation S105, whether the remote control button pushed at the operation 102 was the LOCK button 210. If the LOCK button 210 was pushed, the microcomputer 108 performs lock setting by storing relevant information in the information storage unit 110.

If the LOCK button 210 was not pushed, the microcomputer 108 determines at operation S107 whether or not the UNLOCK button 220 was pushed. If the UNLOCK button 220 was pushed, the microcomputer 108 performs the release (unlock) setting by storing relevant information in the information storage unit 110 at operation S108. If the UNLOCK button 220 was not pushed, the process returns to the operation S101. The operation S104 determining whether the remote controller IDs are consistent with each other may be performed after the operation S105 or S107 determining whether the LOCK button 210 or the UNLOCK button 220 is pushed.

Figure 3:
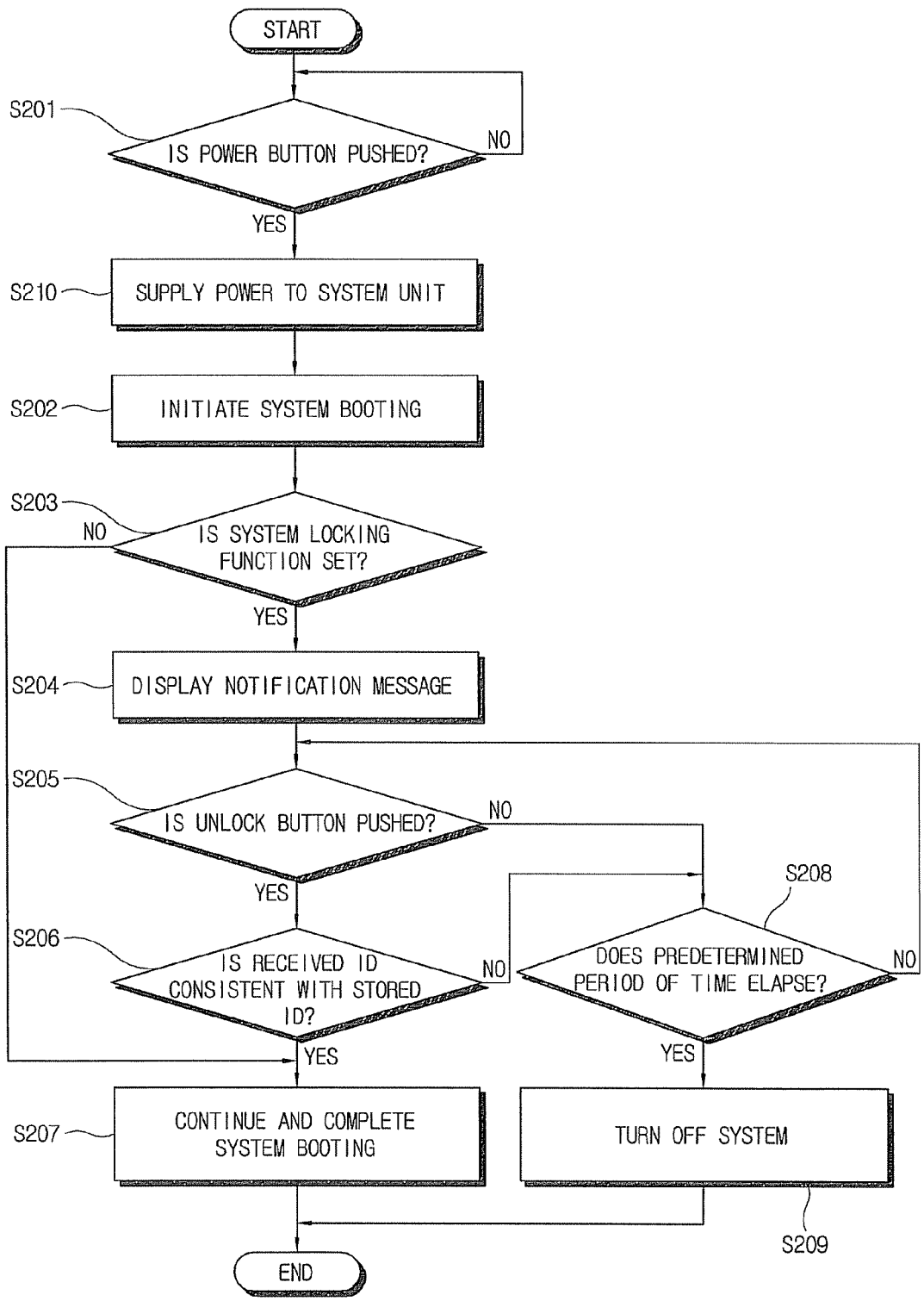
FIG. 3 is a flow chart illustrating a process of performing a system locking function according to an embodiment of the present invention.

FIG. 3 is a flow chart illustrating a process of performing the locking function according to an embodiment of the present invention. First, while the system unit is turned off, the microcomputer 108 determines whether the power button 113 is pushed at operation S201. The computer system 100 may further comprise a sensing circuit (not shown) that detects whether the power button 113 is pushed. The microcomputer 108 may determine whether the power button 113 is pushed by monitoring the sensing circuit at operation S201. If the power button 113 was pushed, the microcomputer 108 enables the power supply unit 112 to turn on the system unit by supplying power to on the components of the system unit at operation S210.

Next, the CPU 101 initiates system booting by executing the BIOS code at operation S202. The system booting includes a POST (Power-On Self-Test). The CPU 101 determines, at operation S203, whether the system locking function is set by referring to the user setting stored in the information storage unit 110 in the process of performing of the POST. If the system locking function is not set, the CPU 101 continues to perform the POST and completes the booting at operation S207.

If the system locking function is set, a notification message, such as "System locking function is now set. Please push 'UNLOCK button' if you want to release the locking function," is outputted through the display unit 105 at operation S204. Output of the notification message may be controlled by the CPU 101 that executes the BIOS or the microcomputer 108. If the system locking function is set, the CPU 101 stops the POST temporarily and transfers control to the microcomputer 108.

Next, the microcomputer 108 determines whether the UNLOCK button 220 of the remote controller 200 is pushed while the POST is stopped. If the UNLOCK button 220 was pushed, the microcomputer 108 compares the remote control ID received from the remote controller 200 with the pre-stored remote control ID at operation S206. If the received remote control ID is consistent with the pre-stored remote control ID, the microcomputer 108 informs the CPU 108 through the south bridge 106 that the locking function is released. The CPU 108 continues the POST to complete the booting at operation S207.

If the UNLOCK button 220 was not pushed or if the received remote control ID is not consistent with the pre-stored remote control ID, the microcomputer 108 determines, at operation S208, whether or not a predetermined period of time has elapsed since the system unit was turned on. If the predetermined period of time has not elapsed, the process returns to the operation S205. If the predetermined period of time has elapsed, the microcomputer 108 controls the power supply unit 112 to stop the supply of power to the components of the system unit at operation S209, thereby turning off the system unit.

According to another aspect of the invention, the operation S204 may be omitted, or the operation S205 confirming whether or not the UNLOCK button 220 of the remote controller is pushed and the operation S206 determining whether the received remote controller ID is consistent with the pre-stored remote controller ID may be reversed in order.

Figure 4:
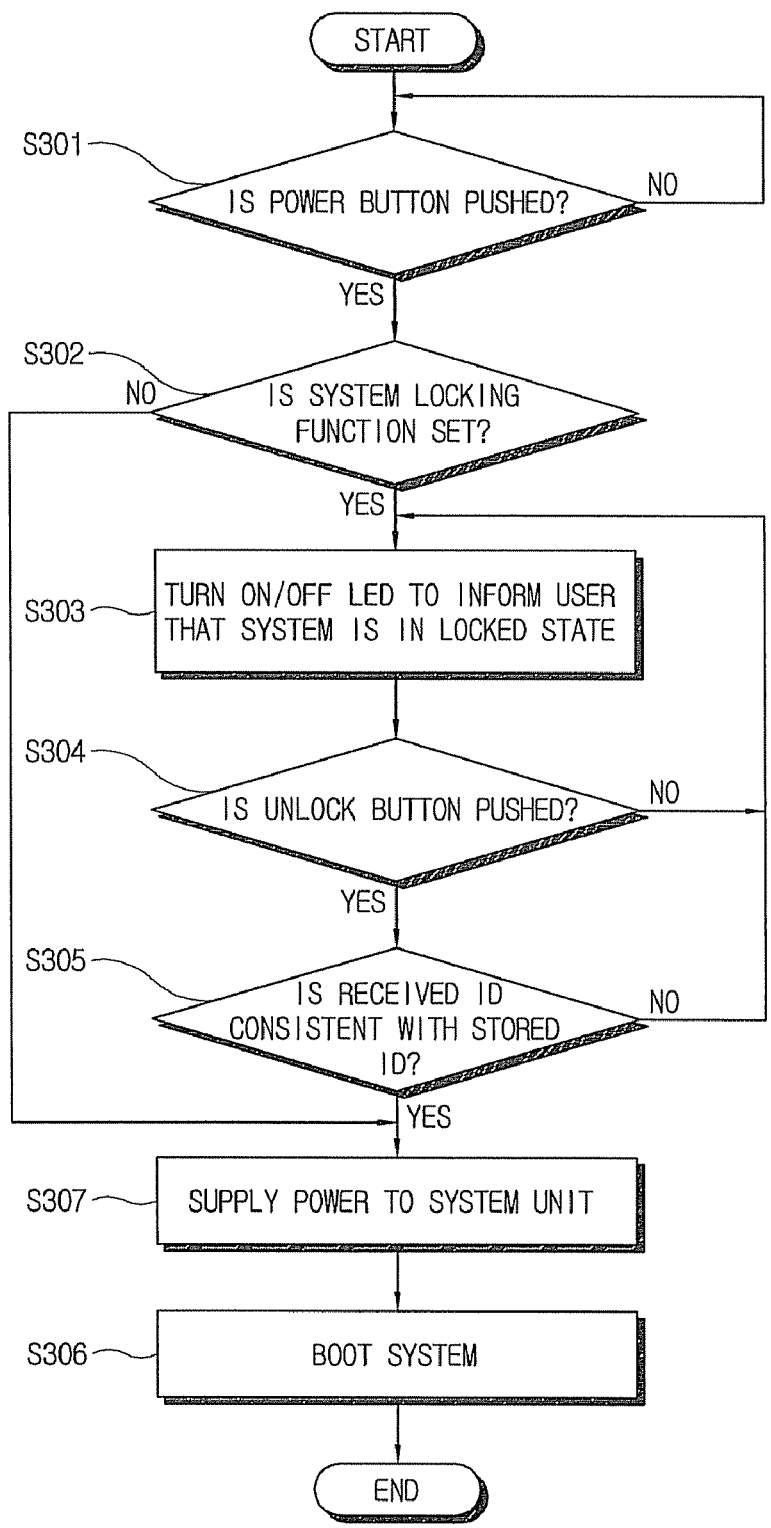
FIG. 4 is a flow chart illustrating a process of performing a system locking function according to another embodiment of the present invention.

FIG. 4 is a flow chart illustrating a process of performing the locking function according to another embodiment of the present invention. First, while the system unit is turned off, the microcomputer 108 determines whether the power button 113 is pushed at operation S301. The microcomputer 108 may determine whether the power button 113 is pushed by monitoring the sensing circuit (not shown). If the power button 113 is pushed, the microcomputer 108 determines whether the system locking function is set by referring to the information storage unit 110.

If the system locking function is not set, the microcomputer 108 enables the power supply unit 112 to turn on the system unit by supplying power to the components of the system unit at operation S306. Next, the CPU 101 performs and completes the system booting including the POST by executing the BIOS code at operation S307. If the system locking function is set, the microcomputer 108 informs the user that the system unit is in the locked state at operation S303. The computer system 100 further comprises an LED 111 indicating that the system unit is in the locked state. The microcomputer 108 turns on/off the LED 111 so that a user can recognize that the system unit is in the locked state. Other aspects of the invention may use other ways to inform the user that the system unit is in the locked state, such as buzzer to emit a sound.

Next, the microcomputer 108 determines whether the UNLOCK button 220 of the remote controller 200 is pushed at operation S304. If the UNLOCK button 220 is pushed, the microcomputer 108 compares the remote controller ID that is received from the remote controller 200 with the pre-stored remote controller ID at operation S305. As a result of the comparison at the operation S305, if the received remote controller ID is consistent with the pre-stored remote controller ID, the operations S306 and S307 are performed.

However, if the UNLOCK button 220 was not pushed or if the received remote controller ID is not consistent with the pre-stored remote controller ID, the process returns to the operation S303. In this embodiment, the operation S304 determining whether the UNLOCK button 220 of the remote controller 200 is pushed and the operation S305 comparing the received remote controller ID with the pre-stored remote controller ID may be reversed in order. The combination of the computer system 100 and the remote controller 200 is an example of a remote control system according to aspects of the present invention.

As apparent from the above description, aspects of the present invention provide a computer system that is capable of setting and releasing a system locking function without difficulty and a control method thereof.

Specifically, according to aspects of the present invention, since the locking function can be set or released by once pushing a LOCK button or an UNLOCK button of a remote controller, user's convenience for security setting is improved.

Particularly, according to aspects of the present invention, the system locking function can be set or released by means of a microcomputer separately from the system unit even when supply of power to the system unit is stopped.

Computer system security techniques according to aspects of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD disks and DVD; magneto-optical media such as optical disks; and hardware devices that are specially configured to store and perform program instructions, such as read-only memory (ROM), random access memory (RAM), flash memory, and the like; and a computer data signal embodied in a carrier wave comprising a compression source code segment and an encryption source code segment (such as data transmission through the Internet). Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A computer system comprising:
  a system unit to perform a predetermined operation;
  a remote control signal receiving unit to receive a user setting from a remote controller, the user setting including at least one of a lock setting and an unlock setting of the system unit; and
  a controller to control the system unit to perform a locking function according to the user setting received by the remote control signal receiving unit while the system unit is turned off, and to control the system unit to be turned off if the unlock setting of the locking function is not received after a predetermined period of time has elapsed since the system unit was turned on.

2. The computer system according to claim 1, further comprising:
  an information storage unit;
  wherein the controller stores the received user setting in the information storage unit or changes the user setting stored in the information storage unit.

3. The computer system according to claim 2, wherein the controller stores or changes the user setting while the system unit is turned off.

4. The computer system according to claim 2, further comprising:
  a power supply unit to supply power to the system unit;
  wherein the system unit comprises a central processing unit (CPU) that receives power from the power supply unit to perform the predetermined operation, and
  wherein the controller comprises a microcomputer to store or change the user setting while supply of power to the CPU is stopped.

5. The computer system according to claim 4, wherein, when the system unit is turned on, if the CPU determines that the locking function is set based on the user setting stored in the information storage unit, the CPU stops booting the system unit until the locking function is released.

6. The computer system according to claim 5, further comprising:
  a display unit;
  wherein the CPU displays a message on the display unit while booting is stopped indicating that the locking function is set.

7. The computer system according to claim 5, wherein the microcomputer controls the CPU to continue booting if the unlock setting of the locking function is received while booting is stopped.

8. The computer system according to claim 5, wherein the microcomputer controls the power supply unit to stop the supply of power to the CPU if the unlock setting of the locking function is not received after a predetermined period of time has elapsed since the system unit was turned on.

9. The computer system according to claim 4, wherein:
  if the microcomputer determines that the locking function is set based on the user setting stored in the information storage unit when the system unit is turned on, the microcomputer controls the power supply unit to stop the supply of power to the CPU until the locking function is released; and the CPU continues booting if the CPU receives power from the power supply unit.

10. The computer system according to claim 9, further comprising:
a light emitting diode (LED) to indicate a setting state of the locking function;
wherein the microcomputer turns on/off the LED if the locking function is set.

11. A remote control system comprising:
a remote controller; and
a computer system comprising a system unit to perform a predetermined operation; a remote control signal receiving unit to receive a user setting from the remote controller, the user setting including at least one of a lock setting and a unlock setting of the system unit; and a controller to control the system unit to perform a locking function of the system unit according to the user setting that is received by the remote control signal receiving unit while the system unit is turned off;
wherein the controller controls the system unit to be turned off if an unlock setting of the locking function is not received by the computer system within a predetermined period of time after the computer system is turned on.

12. A control method of a computer system comprising a system unit that performs a predetermined operation, comprising:
receiving a user setting from a remote controller, the user setting including at least one of a lock setting and a unlock setting of the system unit;
performing a locking function of the system unit according to the received user setting while the system unit is turned off; and
turning off the system unit if the unlock setting of the locking function is not received after a predetermined period of time has elapsed since the system unit was turned on.

13. The control method according to claim 12, further comprising storing the received user setting or changing the stored user setting.

14. The control method according to claim 13, wherein the storing or changing the user setting comprises storing or changing the user setting while the system unit is turned off.

15. The control method according to claim 13, further comprising:
initiating a booting of the system unit, when the system unit is turned on; and
stopping the booting until the locking function is released according to the stored user setting.

16. The control method according to claim 15, further comprising displaying a message while booting is stopped indicating that the locking function is set.

17. The control method according to claim 15, further comprising continuing the booting if the unlock setting of the locking function is received while booting is stopped.

18. The control method according to claim 13, further comprising, if it is determined that the locking function is set based on the stored user setting when the system unit is turned on, suspending the booting of the system unit until the locking function is released.

19. The control method according to claim 18, further comprising informing a user that the system unit is in a locked state when the booting of the system is suspended.

20. A method of securing a system, the method comprising:
receiving a control signal to execute one of a system locking function to lock the system from uses or a system unlocking function to release the system for uses while the system is turned off;
performing one of the system locking function or the system unlocking function if an identification contained within the control signal matches an identification stored in the system; and
turning off the system if the unlock setting of the locking function is not received after a predetermined period of time has elapsed since the system was turned on.

21. A method of securing a system, the method comprising:
beginning a boot process of the system;
suspending the boot process if a system locking function is set;
resuming the boot process if, within a predetermined period of time, an authorized remote control identification is received from a remote control; and
terminating the boot process and shutting down the system if no authorized remote control identification is received from the remote control within the predetermined period of time since the system was turned on.

22. A method of securing a system, comprising:
receiving a signal to turn on the system; and
turning on the system in response to receipt of an authorized remote controller identification from a remote control if a system locking function is set; and
turning off the system if the unlock setting of the locking function is not received after a predetermined period of time has elapsed since the system was turned on.

23. The method according to claim 22, further comprising displaying an indication that the system locking function is set.

24. A computer system comprising:
a system unit; and
a controller arranged to perform a locking function to lock the system unit or an unlocking function to unlock the system unit while the system unit is turned off, according to a user setting signal;
wherein, if the user setting signal to perform the unlocking function is not received before a predetermined time period from turning on the system unit has elapsed, the controller shuts down the system unit.

25. The computer system according to claim 24, wherein, if a booting process begins while the system unit is locked, the controller suspends the boot process until the user setting signal to perform the unlocking function is received.

26. The computer system according to claim 24, further comprising an indicator to indicate whether the system unit is locked or unlocked, wherein the controller activates the indicator while the system unit is locked.

27. The computer system according to claim 1, wherein the controller controls the system unit to perform the locking function when the system unit is turned on.

28. The control method according to claim 12, wherein the performing of the locking function of the system unit occurs when the system unit is turned on.

* * * * *